(12) United States Patent
Blechinger

(10) Patent No.: US 7,382,526 B2
(45) Date of Patent: Jun. 3, 2008

(54) OPTICAL SYSTEM

(75) Inventor: Fritz Blechinger, Munich (DE)

(73) Assignee: Linos Photonics GmbH & Co. KG, Goettingen (DE)

( * ) Notice: Subject to any disclaimer, the term of this patent is extended or adjusted under 35 U.S.C. 154(b) by 0 days.

(21) Appl. No.: 11/334,294

(22) Filed: Jan. 18, 2006

(65) Prior Publication Data

US 2006/0158719 A1    Jul. 20, 2006

(51) Int. Cl.
*G02B 13/14*    (2006.01)
(52) U.S. Cl. .............. 359/359; 359/355; 359/357; 359/353; 359/354
(58) Field of Classification Search ........ 359/355–357, 359/353, 354
See application file for complete search history.

(56) References Cited

U.S. PATENT DOCUMENTS

| 4,199,217 A | 4/1980 | Rogers |
| 4,486,069 A | 12/1984 | Neil et al. |
| 4,679,891 A | 7/1987 | Roberts |
| 5,838,489 A * | 11/1998 | Erdmann ................ 359/357 |
| 5,942,753 A * | 8/1999 | Dell ................ 250/338.1 |
| 2004/0240047 A1* | 12/2004 | Shafer et al. .......... 359/366 |
| 2005/0243411 A1* | 11/2005 | Cook .................. 359/363 |

FOREIGN PATENT DOCUMENTS

| DE | 198 07 093 | 9/1999 |
| EP | 0 843 190 | 5/1998 |
| GB | 2 085 184 | 4/1982 |

\* cited by examiner

*Primary Examiner*—Joshua L Pritchett
(74) *Attorney, Agent, or Firm*—Jordan and Hamburg LLP

(57) ABSTRACT

An optical system projecting onto an image plane an object that is disposed at infinity by an intermediate image. The optical system includes a front group and a relay optic, each including a plurality of lenses, the intermediate image disposed between the front group and the relay optic. The optical system being configured as the object lying at infinity with at least two switchable and/or zoomable fields of view, the fields of view being imaged into the image plane. The front group including at least three lenses successively disposed towards the image plane. A first one of the lenses including of Ge, at least a second of the lenses including of ZnSe, and at least a third of the lenses including of either MgF2, CaF2 or MgO.

11 Claims, 2 Drawing Sheets

OPTICAL SYSTEM

BACKGROUND OF THE INVENTION

The invention relates to an optical system imaging an object at infinity over an intermediate image in an image plane, the optical system having a front group and a relay optical system, which in each case has several lenses and between which the intermediate image lies.

In optical systems, which image radiant heat, stability of the field of view of an object is required over a certain temperature range. Usually this is achieved by manual or by automated refocusing by a motor. With an appropriate optomechanical design, the variation of the focus due to temperature can be minimized to such an extent that it remains within the depth of field and thus remains imperceptible, practically speaking. Refocusing is then no longer necessary, but the cost of the moving components is definitely greater than in uncompensated systems. This kind of optomechanical design of optical systems with manual or automated (motor-driven) refocusing is referred to hereinafter as "active dethermalization."

Dethermalization of focus can be realized, however, even without mechanically operated components by selectively tuning optical components and mechanical supports. This will be referred to hereinafter as passive dethermalization Thus, an optical system of this class is known (DE 19807093 A1), with which, for a single focal length or a single field of view, extensive temperature invariability of the image position can be achieved.

Especially in the case of passive dethermalization for the infrared spectral range, the problems with the generic optical system increase due to the poorer selection of available components that can be used. For this reason a complete passive dethermalization frequently cannot be performed. In this case, a certain residual error in the image position is then tolerated.

BRIEF SUMMARY OF THE INVENTION

It is an object of the invention to propose an optical system with at least two fields of view, in which a completely passive dethermalization is possible.

Due to the teaching of the invention, therefore, an object lying at infinity can be imaged in at least two zoomable and/or switchable fields of view on one image plane, if the front group contains at least three lenses, a first one of which consists of germanium (Ge), at least a second one of zinc selenide (ZnSe) and at least a third of either magnesium fluoride ($MgF_2$), calcium fluoride ($CaF_2$) or magnesium oxide (MgO). With an optical system configured according to the invention, the position of the constant optimum image sharpness, of the focus, is achieved over a large temperature range (amounting to 50° C.) for the at least two fields of view, this passive dethermalization being achieved without any movement or displacement of mechanical or optical components. The maximum deviation of the image positions over the entire temperature range, and for the at least two fields of view together, is within the depth of sharpness limited by diffraction.

The optical system for the at least two fields of view is achromatic in a wavelength range of 4 to 8 μm, preferably 3 to 5 μm, so that the optical system can be used especially for infrared spectral ranges.

In an appropriate embodiment of the invention, the front group has at least four lenses with just one meniscus lens, which consists either of germanium or silicon (Si).

BRIEF DESCRIPTION OF THE DRAWINGS

A preferred embodiment of the invention is explained in greater detail below with reference to the drawings, wherein.

DETAILED DESCRIPTION OF THE INVENTION

Figure 1:
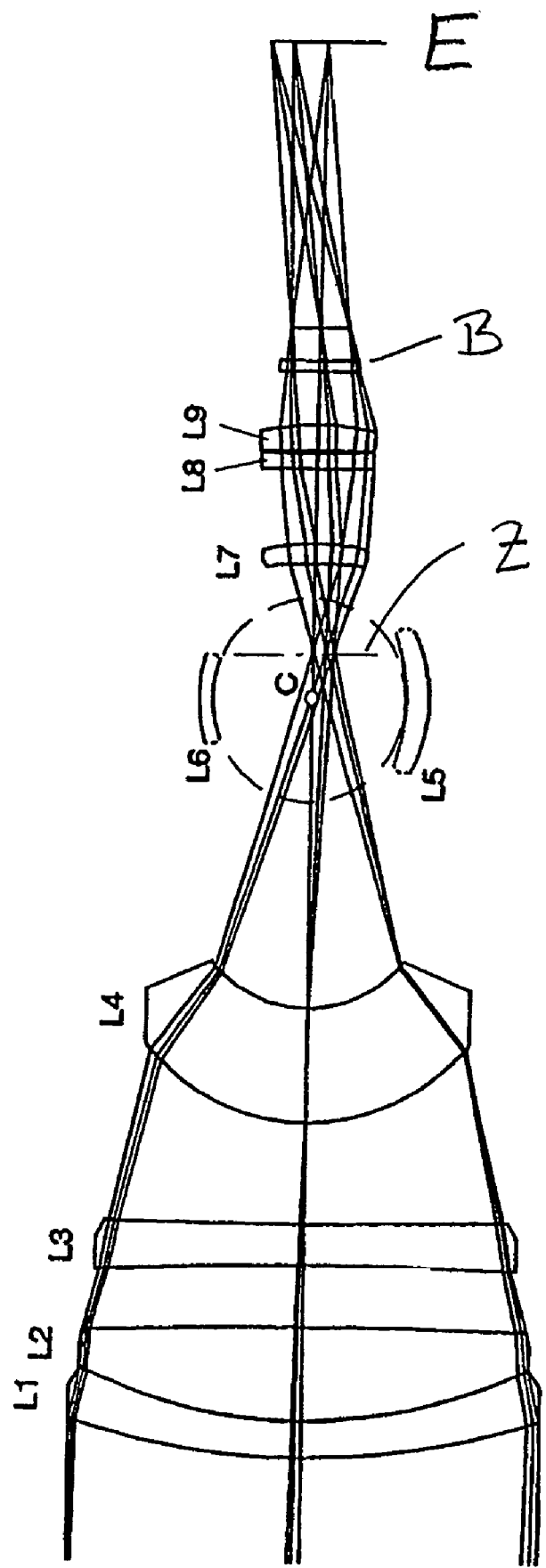
FIG. 1 shows an optical system with just two switchable fields of view, in a first switched state.

The optical system represented in FIG. 1, has a front group L1-L5 of at least three lenses L1, L2, L3, which is arranged behind a meniscus lens L4 which consists of Ge or Si. Of the at least three lenses L1, L2, L3, the front group consists of at least one of Ge, at least a second of ZnSe and at least a third either of MgF2, CaF2 or MgO.

Between the image plane E and the front group L1-L5 a relay optic L6-L9 is provided, between which and the front group L1-L5 an intermediate image Z is produced. Also, a physical diaphragm B is provided between the last lens L9 of the relay image plane E to achieve a one-hundred percent cold diaphragm effectiveness.

Figure 2:
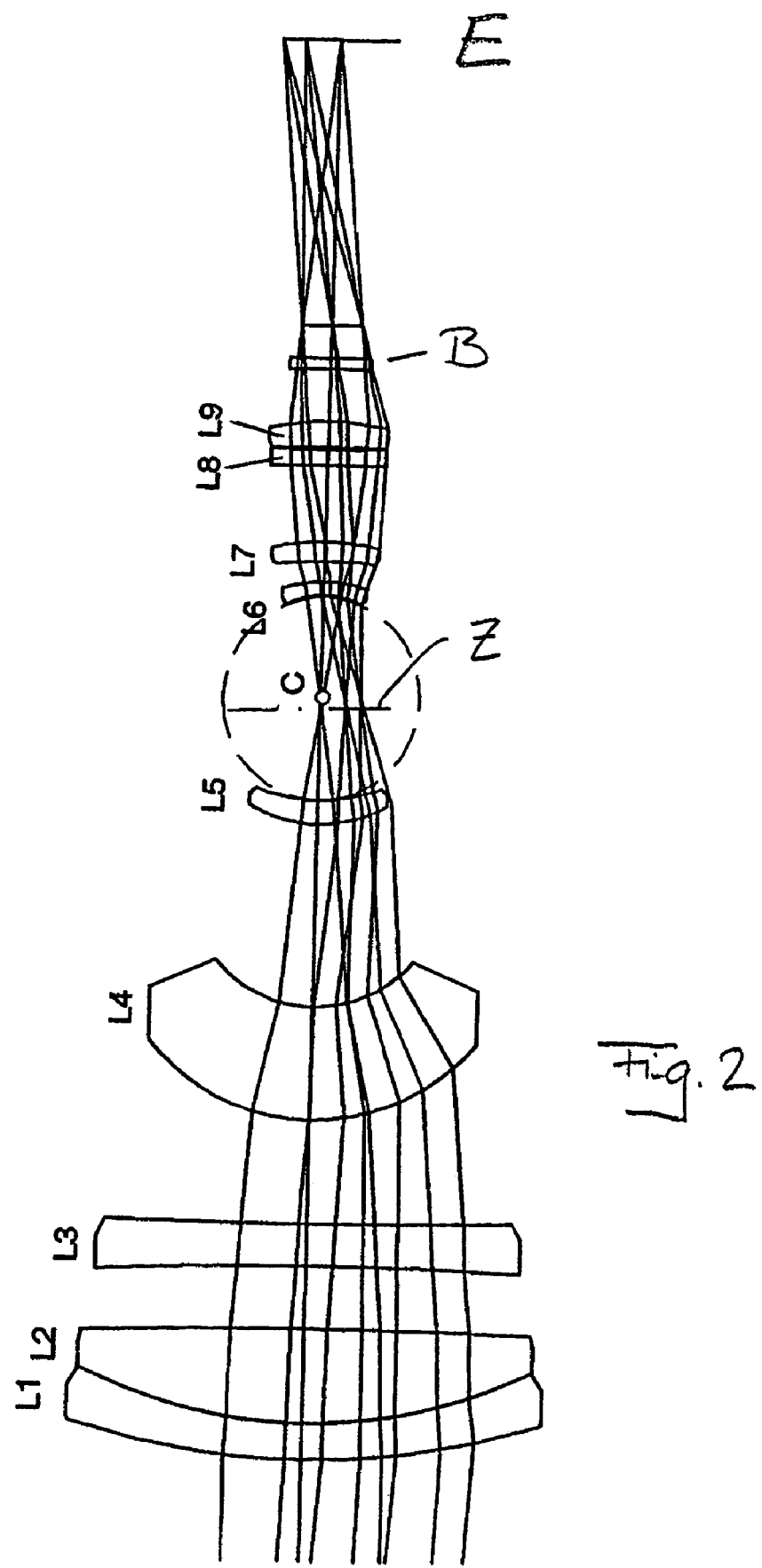
FIG. 2 the optical system of FIG. 1 with the second field of view in the other switched state.

Also, in the area of the intermediate image Z two lenses L5 and L6 are provided which are fixed in relation to one another but can be rotated together, which in their one switch position (FIG. 1) lie outside of the ray path and, in order to switch to the second field of view, they can be turned to their second position about their pivot point C, located close to the intermediate image E for the small field of view, into the ray path (FIG. 2).

The two lenses L5-L6 are in this case formed of the last lens L5 in the ray path to the second image plane E and the first lens L6 of the relay optic L6-L9.

The at least two fields of view (wide field of view "WFOV" and narrow filed of view "NFOV") in this case have a ratio of 1.5<WFOV/NFOV<5. The numerical aperture ("NA") on the image side amounts to 0.05<NA<0.15.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

I claim:

1. An optical system projecting onto an image plane an object that is disposed at infinity by an intermediate image, said optical system comprising:

a front group and a relay optic, each including a plurality of lenses, said intermediate image disposed between said front group and said relay optic;

said optical system being configured as the object lying at infinity with at least two switchable and/or zoomable fields of view, said fields of view being imaged into said image planet;

said front group including at least three lenses successively disposed towards said image plane;

a first one of said lenses comprising of Ge;

at least a second of said lenses comprising of ZnSe; and at least a third of said lenses comprising of either MgF2, CaF2 or MgO, wherein the front group includes a fourth lens, said fourth lens being a meniscus lens disposed adjacent to said third lens and nearer to said image plane.

2. The system of claim 1, wherein said meniscus lens consists either of Ge or Si.

3. The system of claim 1, further comprising:
a fifth lens and a sixth lens being fixed together and being rotatable together for switching into a second of said fields of view; and
a center of rotation of said fifth and sixth lenses being disposed nearer to said intermediate image than said sixth lens.

4. The system of claim 3, wherein said fifth lens is disposed in said front group.

5. The system of claim 4, wherein said fifth lens is nearer to said image plane than other lenses in said front group; and
said sixth lens being disposed in said relay optic farther from said image plane than other lenses in said relay optic.

6. The system of claim 5, wherein said fifth and sixth lenses are rotatable by substantially 90° around a common pivot point.

7. The system of claim 5, wherein said optical system for the at least two fields of view is achromatic in a wavelength range of 4 to 8 µm.

8. The system of claim 5, wherein a physical diaphragm is disposed between said relay optic and said image plane.

9. The system of claim 8, wherein said at least two fields of view are in a ratio of 1.5<(wide field of view)/(narrow field of view)<5.

10. The system of claim 8, wherein a numerical aperture on the image side amounts to 0.05<numerical apertured <0.15.

11. The system of claim 5, wherein said optical system for said at least two fields of view is achromatic in a wavelength range of 3 to 5 µm.

* * * * *